F. R. L. STOTT AND E. E. SHIERK.
EMERGENCY BUMPER FOR VEHICLES.
APPLICATION FILED JULY 22, 1921.
1,412,578.
Patented Apr. 11, 1922.
2 SHEETS—SHEET 1.
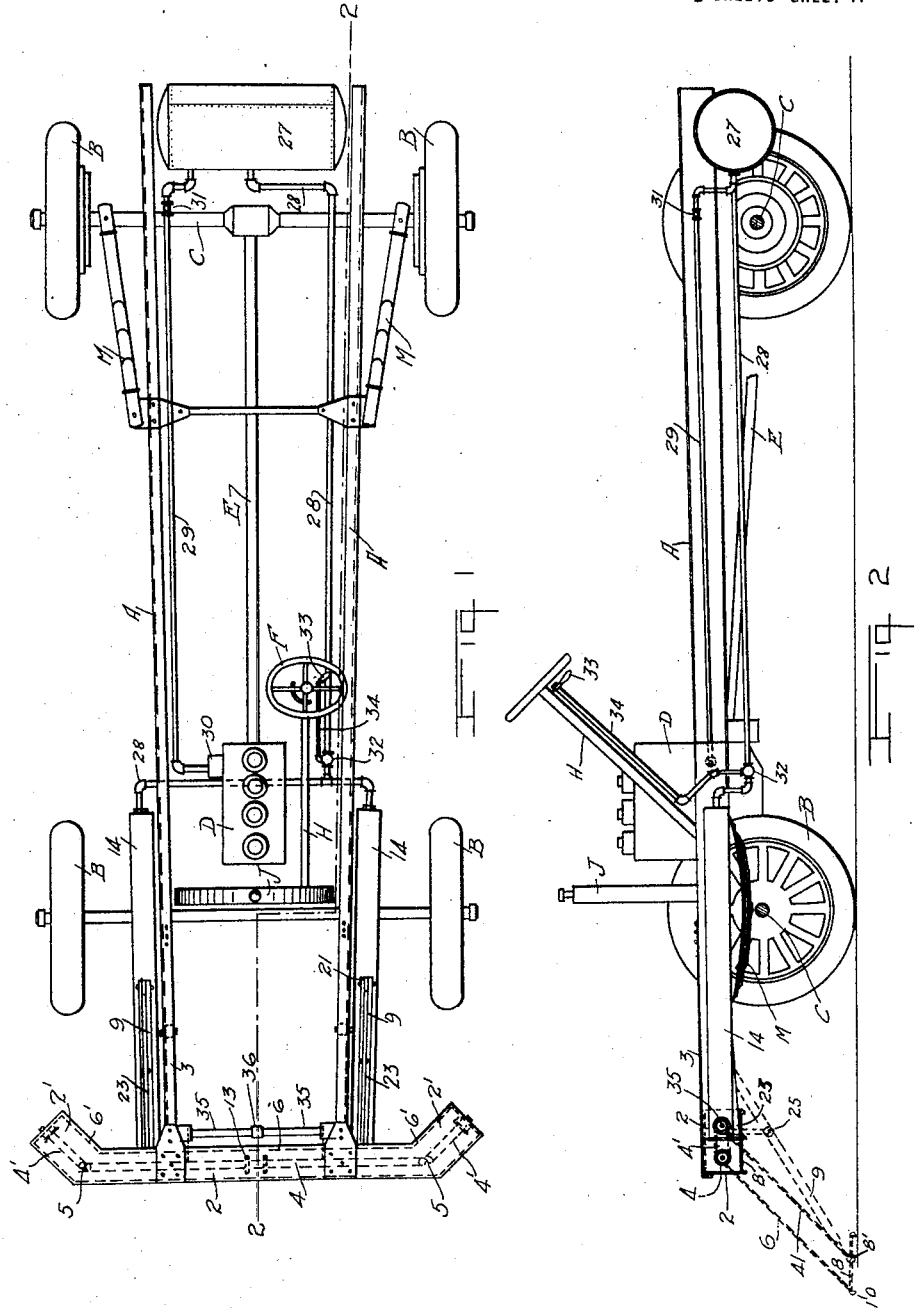
INVENTORS
FREDERICK R.L. STOTT &
ELI E. SHIERK
BY
ATTY.

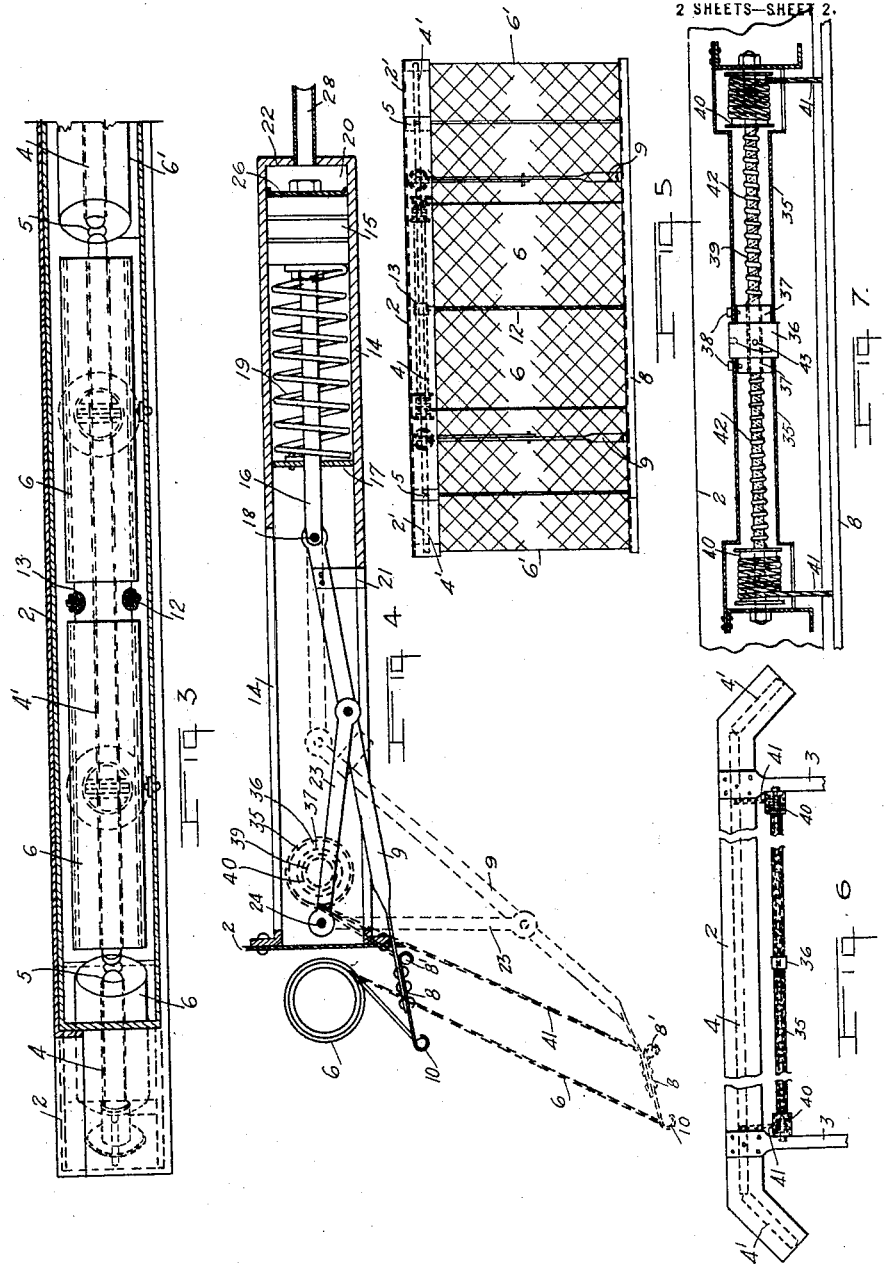

UNITED STATES PATENT OFFICE.

FREDERICK R. L. STOTT AND ELI E. SHIERK, OF HAMILTON, ONTARIO, CANADA, ASSIGNORS OF ONE-THIRD TO OSCAR W. HAIST, OF HAMILTON, ONTARIO, CANADA.

EMERGENCY BUMPER FOR VEHICLES.

1,412,578.      Specification of Letters Patent.      Patented Apr. 11, 1922.

Application filed July 22, 1921. Serial No. 486,706.

*To all whom it may concern:*

Be it known that we, FREDERICK R. L. STOTT and ELI E. SHIERK, both subjects of the King of Great Britain, residing at Hamilton, in the county of Wentworth and Province of Ontario, Canada, have invented certain new and useful Improvements in an Emergency Bumper for Vehicles, of which the following is a specification.

Our invention relates to improvements in emergency bumpers for vehicles, and more particularly to improvements in the invention set forth in our prior Patent No. 1,355,182, of date the 12th of October, 1920, in which we described a compressed air controlled bumper for automobiles, surface cars and the like, whereby by means of compressed air a protective bumper or fender may be instantaneously lowered or adjusted to protect and to pick up any pedestrians who may accidentally assume a position in the path of an approaching vehicle of the class specified.

This invention consists essentially of an auxiliary spring controlled mechanism for assisting in returning the apron to normal position subsequently to the device being used, with an object of reducing the tension on the spring for returning the apron actuating mechanism to normal with a view of rendering the device effective at a greatly reduced air pressure.

These together with other objects may be attained by the construction, combination and arrangement of the parts, as will hereinafter be more fully described, illustrated in the accompanying drawing, and pointed out in the claims hereunto appended.

With reference to the accompanying drawings:

Figure 1 is a plan view of the apparatus illustrated in connection with and as may be adapted to an automobile, by way of example;

Figure 2 is a sectional side elevation of Figure 1, taken on the line 2—2;

Figure 3 is an enlarged detailed front elevation of the actual bumper or fender;

Figure 4 is an enlarged sectional side elevation of the apron operating mechanism;

Figure 5 is a front elevation of the bumper showing the apron in extended position;

Figure 6 is a top view of the bumper showing the apron returning mechanism housing; and.

Figure 7 is an enlarged detailed front elevation of the apron returning mechanism.

Similar reference characters refer to similar parts throughout the several views.

As heretofore specified, we illustrate our invention as adapted to an automobile, the Figures 1 and 2 representing generally the chassis of an automobile, the frame thereof being designated by A, the wheels by B, the axles by C, the motor or engine by D, the propeller shaft by E, the steering wheel by F, the steering wheel column by H, the cooling radiator by J, and the springs by M.

The bumper casing, indicated by 2, is supported in an elevated position from the road by substantially horizontal brackets 3, secured to the forward end part of the frame A, as shown in Figures 2 and 3, and includes angular end parts 2'. This casing comprises top, sides and ends, the bottom being open. Mounted and journalled in the casing is a roller 4 and auxiliary rollers 4', all being connected by knuckle or universal joints 5.

Secured to the roller 4 is an apron 6, preferably constituted of fabric material, and normally rolled thereupon.

The free end of said apron is attached to a bar 8 hingedly secured to a connecting rod 9, and adapted, when the said apron is in extended position, to assume a position parallel to the ground by means of the hinges 8'. Rubber or other cushioning and shock absorbing material 10 is secured to the forward part of the bar 8.

Aprons 6' similar to the apron 6 are attached and rolled upon the roller 4'.

In order to augment the strength of the apron 6, we provide a cord or tape 12 attached to the central portion thereof, and adapted to wind upon a grooved sheave 13 in the corresponding portion of the roller 4.

Rigid with each side member of the frame A of the vehicle are cylinders 14 having slidable therein pistons 15 rigid on one end of the piston rods 16 which pivotally connect with the connecting rods 9 at 18.

The said piston rods are sleeved through stationary cross-heads 17 in the interior of the cylinders, and between the cross-heads and the pistons are inserted spiral push springs 19 adapted to retain the pistons in normal positions at dead centre in the cylinder heads 20, as shown in Figure 5.

It will be seen that while the pistons 15 are in the above described position, the apron 6 will be wound upon its roller 4, and not extended.

The connecting rods 9 operate through longitudinal slots in the cylinders 14 and stops 21 are provided on said rods and adapted to engage the rear ends of said slots when the pistons 15 have reached their dead centres in the cylinder heads, and consequently prevent said pistons from striking the cylinder end plates 22. 23 are governor rods pivotally connected at 24 to the forward end parts of the cylinders 14, and having pivot and slot connections at 25 to the connecting rods 9 intermediate of their ends. A bucket washer, indicated by 26, is secured to the piston in order to seal compression.

A tank 27, for containing compressed air, is located in a convenient and suitable position in the chassis, and is shown suspended in the rear frame by way of example.

An air line pipe 28 communicates with the cylinder heads 20 and with the tank 27, and another air line pipe 29 communicates with said tank and with an air pump 30 secured to and operated by the engine D.

An automatic check valve 31 in the pipe 29 keeps the air from returning to the pump 30, after the latter has ceased to operate.

A two-way valve 32 is inserted in an intermediate position in the pipe 28, and is actuated from the driver's seat by means of a lever 33 rigid with a stem 34 connected to the said valve and rotatable in a bearing secured to the steering column 4.

The operation of the invention as thus far described is as follows:—

While the engine D is in motion, air is pumped to the tank 24 until a suitable pressure is attained, when the pump 30, which is automatic, ceases to operate.

When the driver of the vehicle notices the probability of a collision with a pedestrian, he opens the valve 32 whereupon the compressed air in the tank instantaneously forces the pistons 15 to the opposite end of the cylinders 14 and consequently actuating the apron-lowering mechanism.

Tubular housings 35 secured to the horizontal brackets 3 extend inwardly therefrom to where they engage a rotatable member 36 having lateral circular projections 37 which are enclosed by the inner ends of the housings as shown in Figure 7. This rotatable member may be secured against rotation by set screws 38 which penetrate the housings 35 and thread into the lateral projections 37.

A rod 39 rigidly secured to the brackets 3 extends through the housings 35 and through the rotatable member 36. Loosely sleeved on this rod are spools 40 upon which are adapted to wind wire strand cables 41, the opposite ends of which are connected to the bar 8.

Spiral springs 42 are sleeved upon the rod 39 intermediately of the spools 40 and the projections 37 of the rotatable member, the respective ends of the springs being secured to these members. When the apron actuating mechanism extends the apron, the cables 41 unwind from the spools and consequently tension the springs 41 which are designed to return the apron to normal position when the valve 32 is closed and the apron actuating mechanism is permitted to return to normal by the spring 19.

The tension of the springs 42 may be adjusted by loosening the set screws 38 and rotating the member 36 in the required direction, then re-tightening the set screws. For this purpose we provide a plurality of cavities 43 in the member 36 in which may be inserted a corresponding instrument for turning it.

Having now fully described our invention, what we claim and desire to secure by Letters Patent, is:—

1. In a device of the class described, the combination with the frame of a vehicle, of a bumper, an apron on a roller mounted in the bumper, a bottom rod secured to the free end of said apron, means for lowering said bottom rod and unwinding said apron, a rigid rod secured transversely of the vehicle, spools loose on said rod, cables wound on said spools and connected to said bottom rod, springs tensioned when the spools are unwound and adapted to rewind the apron by rotating the spools to rewind the cables thereon when the apron lowering mechanism is released.

2. In a device of the class described, the combination with the frame of a vehicle, of a bumper, an apron on a roller mounted in the bumper, a bottom rod secured to the free end of said apron, means for lowering said bottom rod and unwinding said apron, a rigid rod secured transversely of the vehicle, spools loose on said rigid rod, cables wound on said spools and connected to said bottom rod, spiral springs sleeved on said rigid rod and secured at one end to said spools and at their opposite ends to a fixed member.

3. In a device of the class described, the combination with the frame of a vehicle, of a bumper, an apron on a roller mounted in the bumper, a bottom rod secured to the free end of said apron, means for lowering said bottom rod and unwinding said apron, cylindrical housings secured transversely of the vehicle, a fixed rod rigid within said housings, a rotatable member interposed between said housings, circular extensions on said member enclosed by the ends of said housings, means permitting rotation of said member and for retaining it in fixed relation to said housings, spools loose on said fixed rod, cables wound on said spools and connected to said bottom rod, spiral springs sleeved on said fixed rod and secured at one end to said spools and at their opposite ends to said circular extensions.

In testimony whereof we have affixed our signatures.

FREDERICK R. L. STOTT.
ELI E. SHIERK.

Witnesses:
H. G. HENDRY,
V. D. EARLE.